(12) United States Patent
Binsfeld

(10) Patent No.: US 6,298,890 B1
(45) Date of Patent: Oct. 9, 2001

(54) OFF-ROAD TIRE

(75) Inventor: Adrien Alphonse Binsfeld, Colmar-Berg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/465,037

(22) Filed: Dec. 16, 1999

(51) Int. Cl.[7] .......................... B60C 11/11; B60C 11/113; B60C 103/04; B60C 107/02; B60C 121/00
(52) U.S. Cl. .................. 152/209.16; 152/209.12; 152/209.22; 152/902; 152/903
(58) Field of Search .................. 152/209.1, 209.12, 152/209.13, 209.18, 903, 902, 209.22, 209.16, 209.15; D12/149, 150, 151, 137, 138

(56) References Cited

U.S. PATENT DOCUMENTS

| D. 49,211 | * | 6/1916 | Hewitt . | |
|---|---|---|---|---|
| D. 64,931 | * | 6/1924 | Paull . | |
| D. 78,537 | | 5/1929 | Savage . | |
| D. 104,149 | | 4/1937 | Smith . | |
| D. 107,287 | * | 11/1937 | Thomas . | |
| D. 190,155 | | 4/1961 | Custer | D90/20 |
| D. 191,652 | | 10/1961 | Smajd | D90/20 |
| D. 216,355 | | 12/1969 | Porosky | D90/20 |
| 1,946,209 | * | 2/1934 | Hardeman et al. | 152/209.1 |
| 2,113,527 | | 4/1938 | Hale | 152/14 |
| 2,415,290 | | 2/1947 | Kreyer | 152/209 |
| 3,196,920 | * | 7/1965 | Fishman | 152/209.22 |
| 4,412,575 | * | 11/1983 | Maeda et al. | 152/209.13 |
| 4,727,917 | * | 3/1988 | Stewart | 152/209.22 |
| 5,058,643 | * | 10/1991 | Nakasaki | 152/209.22 |
| 5,188,683 | * | 2/1993 | Bonko | 152/209.12 |
| 6,189,586 | * | 2/2001 | Guidry | 152/209.16 |

FOREIGN PATENT DOCUMENTS

| 768057 | * | 7/1934 | (FR) | 152/209.12 |
|---|---|---|---|---|
| 2157211 | * | 5/1973 | (FR) | 152/209.12 |
| 2229974 | * | 10/1990 | (GB) | 152/903 |
| 3-74207 | * | 3/1991 | (JP) | 152/209.12 |
| 8-40020 | * | 2/1996 | (JP) | 152/209.22 |

* cited by examiner

Primary Examiner—Steven D. Maki
(74) Attorney, Agent, or Firm—David L King; Robert W Brown

(57) ABSTRACT

An off-road pneumatic tire 10 having a tread 12 with a plurality of lugs 14, each lug 14 having a wide section 22 near at least one shoulder of the tread and a narrow section 24 crossing a centerline of the tread. In a preferred embodiment, each lug 14 having two wide sections 22, one extending from each shoulder 16, 18 of the tread 12 and being interconnected by the narrow section 24.

6 Claims, 8 Drawing Sheets

OFF-ROAD TIRE

TECHNICAL FIELD

This invention relates to a pneumatic tire and, more particularly, to a pneumatic tire for off-road use.

BACKGROUND ART

Tire designers are continuously working to improve a tire's working footprint. The working footprint affects the following tire variables: traction, noise, vibration, and handling. Although these variables are the same for all types of tires, the importance of each variable is dependent upon the type of tire. For example, in off-road tires, users are primarily concerned with the traction and vibration of the working footprint.

A large portion of the vibration caused by a tire occurs when a lug either enters the footprint or leaves the footprint. Upon entering the footprint, the tread lug is compressed causing an impact vibration. When a tread lug leaves the footprint, the lug snaps back to its original position causing additional vibration. The amplitude of the vibration is highest when the footprint length is such that an entering lug impacts at the same time that a leaving lug snaps back to its original position.

The Goodyear RL-2 Radial Semi Xtra Tread Traction tire as seen in the 1984 Tread Design Guide at page 205 is an off-road tire used on articulated dump trucks, loaders, graders, and other off-road machinery. The RL-2 provides excellent traction, especially circumferential traction. However, in some applications the RL-2's tread design causes higher than desired vibration.

Two major factors contributing to the high vibration of the RL-2 are the nearly axial alignment of the lugs and the width of the lateral grooves. The nearly axial alignment of the lugs allows a large percentage of each lug to enter the footprint at once. This causes an instantaneous compression of a large percentage of the lug and results in increased vibration. The RL-2 also has wide lateral grooves. Since wider grooves lower a tire's bending stiffness, the wide lateral grooves of the RL-2 result in a low circumferential bending stiffness allowing the tread to easily bend in a circumferential direction. The more the tread bends, the greater the lugs protrude from the tread surface and the greater the amplitude of the vibration caused by their impact and release. In addition to lowering a tire's bending stiffness, the wider grooves reduce the area of the lugs in the footprint of the tire. As a result, the pressure distributed upon each lug in the footprint is increased. As the pressure upon each lug is increased, the amount of deformation of the respective lug is increased, resulting in an increase in the amplitude of the vibration.

This invention makes further improvements to the working footprint of an off-road tire. The tire of this invention provides excellent traction, yet lower vibration than the tires disclosed in the prior art.

SUMMARY OF THE INVENTION

This invention relates to a pneumatic tire 10 for off-road use. The pneumatic tire 10 has a tread 12. The tread 12 has a plurality of lugs 14 extending from a first shoulder 16 to a second shoulder 18. The plurality of lugs 14 are separated by a plurality of wide grooves 20.

Each lug 14 of the tread 12 has a wide section 22 near at least one of the respective shoulders and a narrow section 24 near a centerline of the tire. Each lug 14 may extend straight across the tread 12 or may be inclined from the first shoulder 16 to the second shoulder 18.

Definitions

For ease of understanding this disclosure, the following terms are disclosed:

"Circumferential" means lines or directions extending along the perimeter of the surface of the annular tire parallel to the equatorial plane (EP) and perpendicular to the axial direction.

"Footprint" means the contact patch or area of contact of the tire tread with a flat surface at zero speed and under normal load in pressure or under specified load, pressure, and speed conditions.

"Groove" means an elongated void area in a tread that may extend circumferentially or laterally about the tread in a straight, curved, or zigzag manner. The depth of a groove may vary around the circumference of the tread, or the depth of one groove may be constant but vary from the depth of another groove on the tire.

"Lateral" means in an axial direction.

"Leading" refers to a portion or part of the tread that contacts the ground first, with respect to a series of such parts or portions, during rotation of the tire in the preferred direction of travel.

"Lugs" means a radial rows of tread rubber extending across the width of the tire. At least part of the lug is in direct contact with the ground or road surface. A lug can be made up of a plurality of tread elements that are separated by grooves.

"Non-skid" means the depth of grooves in a tire tread.

"Pitch" means the distance from one peak in the tread pattern to the next. Pitch refers to the circumferential distance from one design feature in a tread pattern to the next similar design feature.

"Pneumatic tire" means a laminated mechanical device of generally toroidal shape, usually an open torous, having beads and a tread and made of rubber, chemicals, fabric and steel or other materials. When mounted on the wheel of a motor vehicle, the tire though its tread provides a traction and contains the fluid that sustains the vehicle load.

"Shoulder" means the upper portion of the sidewall just below the tread edge.

"Stiffness" means the measure of a tire's ability to act like a spring.

"Tie Bar" refers to an extra thickness of rubber at the bottom of a groove such that, in the location where the extra rubber is present, the groove depth is less than the groove depth at other locations. Tie bars stabilize a lug by limiting the independent movement of two portions of a lug that are separated by the groove. Tie bars can also be present between two adjacent lugs.

"Trailing" refers to a portion or part of the tread that contacts the ground last, with respect to a series of such parts or portions, during rotation of the tire in the preferred direction of travel.

"Tread Centerline" refers to the intersection of the equatorial plane (EP) with the tread.

BRIEF DESCRIPTION OF DRAWINGS

The invention will be described by way of example and with reference to the accompanying drawings in which.

DETAILED DESCRIPTION OF THE INVENTION

Figure 1:
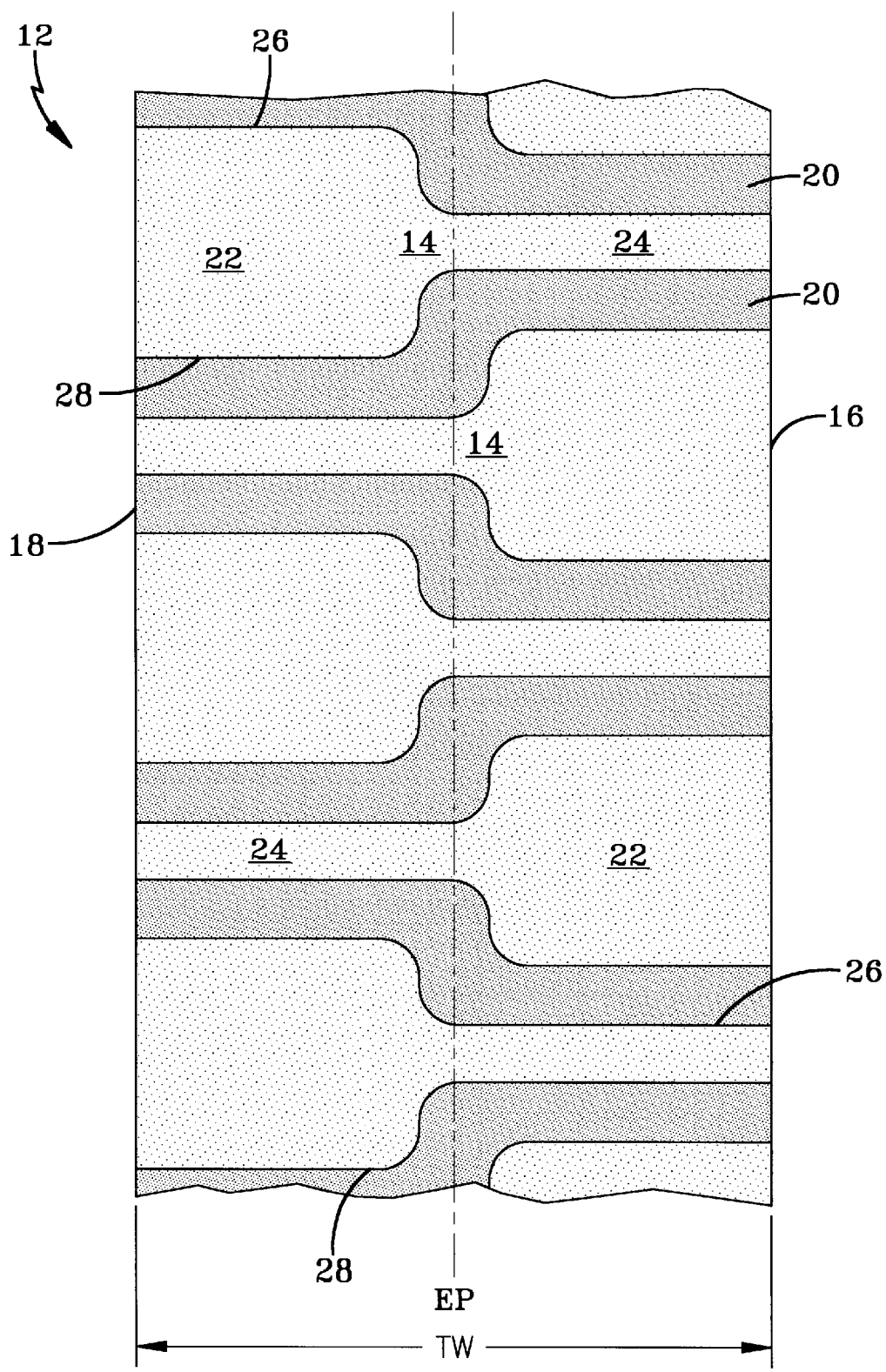
FIG. 1 shows an embodiment of the invention.

FIG. 1 shows a pneumatic tire for off-road use having a tread 12 with a plurality of lugs 14. The lugs 14 extend from a first shoulder 16 to a second shoulder 18. The plurality of lugs 14 are separated by a plurality of wide grooves 20. Each lug 14 has a wide section 22 and narrow section 24. The wide section 22 extends from at least one of the respective shoulders 16, 18 toward the centerline of the tire. The narrow section 24 connects to the wide section 22 near the centerline of the tread 12. The narrow section 24 extends to the other shoulder of the tread 12. The wide section 22 of each lug 14 alternately extends from a first shoulder 16, then from a second shoulder 18, as each lug 14 on the tread 12 is encountered. The alternating of the wide section 22 from one shoulder to the other gives each wide groove 20 an S-shaped configuration. As a result, the leading edge 26 of a respective lug 14 at least partially overlaps the trailing edge 28 of a circumferentially adjacent lug 14.

The pneumatic tire 10 shown in FIG. 1 has a working footprint with both excellent traction, especially in a circumferential direction, and reduced vibration as compared to the RL-2. The lateral extension of the leading edge 26 of each lug 14 provides excellent circumferential traction for the tread 12. Lateral traction is provided by both the tread shoulders 16, 18 and the surfaces of each lug 14 where the wide section 22 is reduced to meet the narrow section 24. The tread 12 of FIG. 1 has an increased circumferential bending stiffness due to the S-shape of the lateral grooves. This increased bending stiffness helps to reduce the amount that each lug 14 protrudes from the tread 12. As a result, the impact and snap back of the lugs 14 as they enter and leave the footprint are decreased. The overlap of the wide sections 22 of circumferentially adjacent lugs 14 also aids in reducing the amplitude of the vibration. As the leading edge 26 of a wide section 22 of a respective lug 14 enters the footprint, a portion of the wide section 22 of a circumferentially adjacent, preceding lug is still entering the footprint. As a result, the impact compression of the leading edge 26 of the wide section 22 of the lug 14 is reduced. Additionally, as the final portion of the circumferentially adjacent, preceding lug leaves the footprint, the leading edge 26 of the wide section 22 of a lug 14 is still located within the footprint so the snap back vibration of the tread 12 is also reduced.

Figure 2:
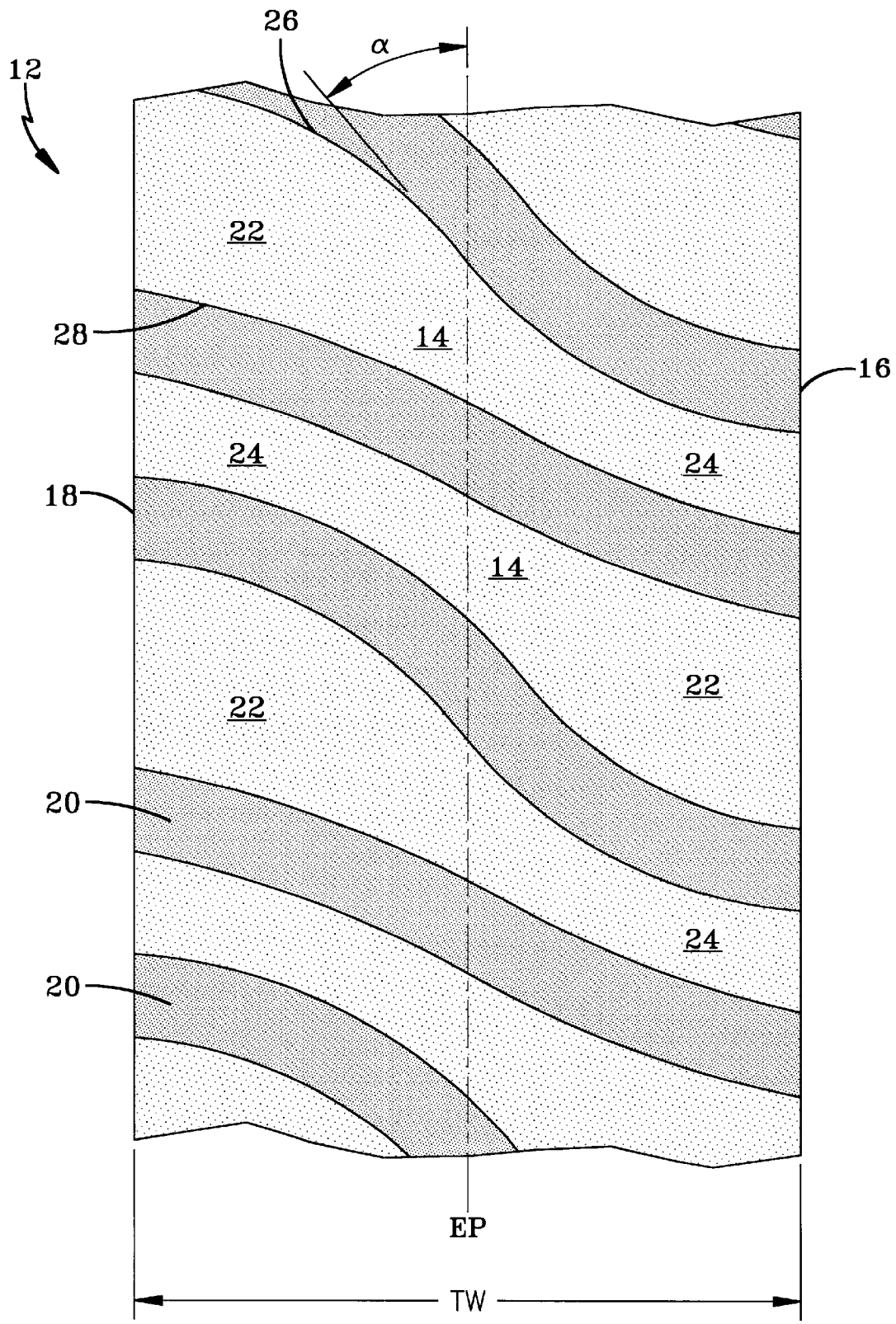
FIG. 2 shows an embodiment of the invention where each lug 14 is inclined from a first shoulder 16 to a second shoulder 18.

FIG. 2 shows an embodiment of the invention where each lug 14 is inclined from a first shoulder 16 to a second shoulder 18. This incline of the respective lugs 14 provides additional circumferential bending stiffness. This increased circumferential bending stiffness further reduces the amplitude of the vibration by decreasing the amount of protrusion of the leading edge 26 of each lug 14 and by increasing the overlap of the respective lugs 14. Additionally, the incline in the leading edge 26 of each lug 14 increases the lateral traction of the tread 12. Inclining the lugs 14 also results in smoother wide grooves 20 that are more likely to eject mud and other foreign materials than the wide grooves 20 shown in FIG. 1. Although the leading edge 26 and the trailing edge 28 of each lug 14 may approach a respective shoulder 16, 18 at any angle, for best results in circumferential traction, each edge 26, 28 should approach an angle perpendicular to the centerline of the tread as it approaches the respective shoulders 16, 18.

Figure 3:
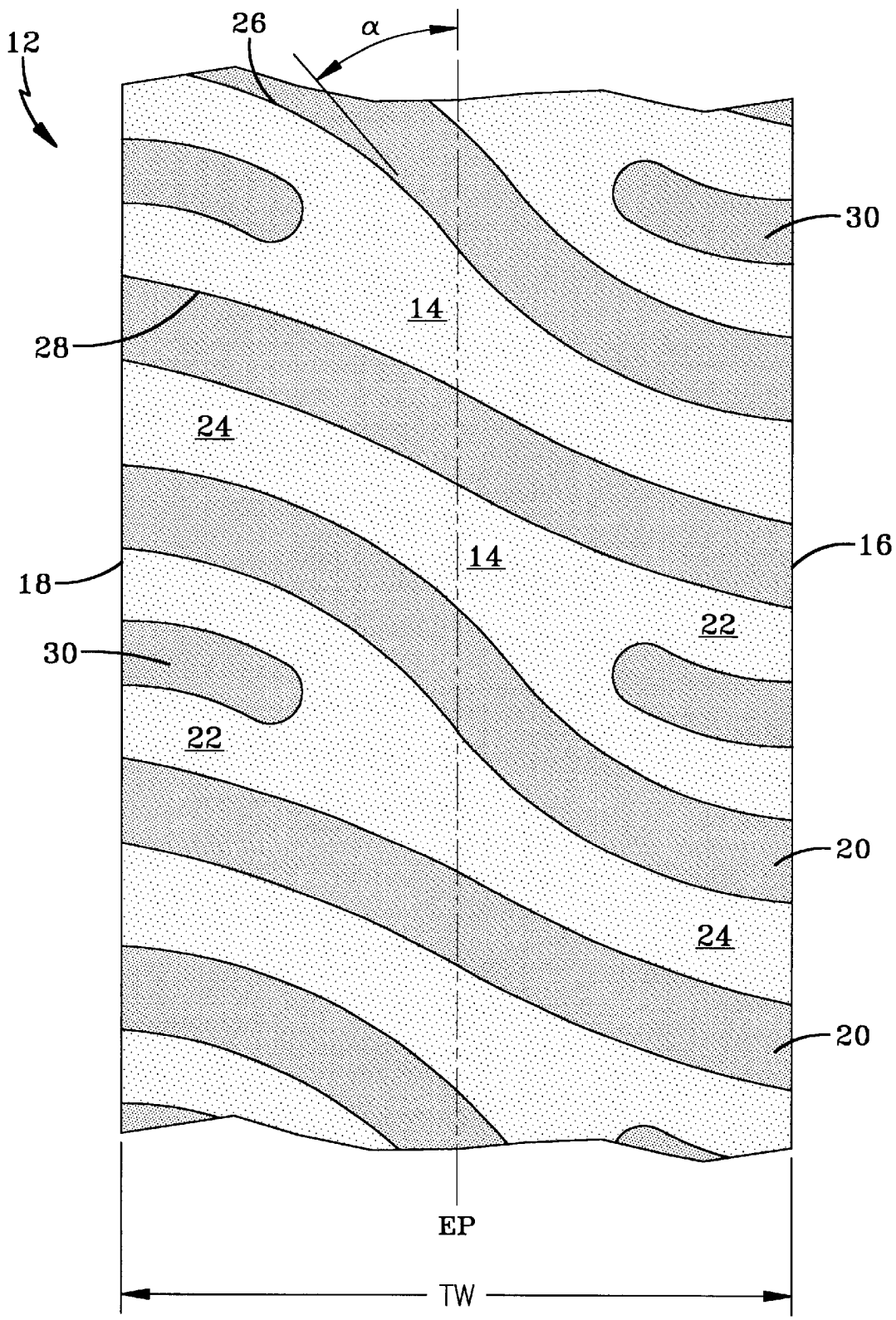
FIG. 3 shows the embodiment of FIG. 2 further having shoulder grooves 30 located in the wide section 22 of each lug 14.

In FIG. 3, each inclined lug 14 has a shoulder groove 30 in its wide section 22. The shoulder groove 30 extends from a respective shoulder 16, 18 into the central portion of a respective wide section 22. If the tread 12 has a width of TW, each shoulder groove 30 can extend in a lateral direction an amount in the range of 15% to 45% of the tread width TW. Although the circumferential length of each shoulder groove 30 can vary, in the preferred embodiment, the circumferential length of each shoulder groove 30 will be in the range of 20% to 40% of the circumferential width of the wide section 22 of the respective lug 14. If the wide grooves 20 have a depth of full non-skid NSK, then each shoulder groove 30 has a depth in the range of 50% to 100% of the nonskid depth NSK. Ideally, the incline of each lug 14 will be at an angle a in the range of 20 to 70 degrees from the centerline of the tire 10.

Figure 4:
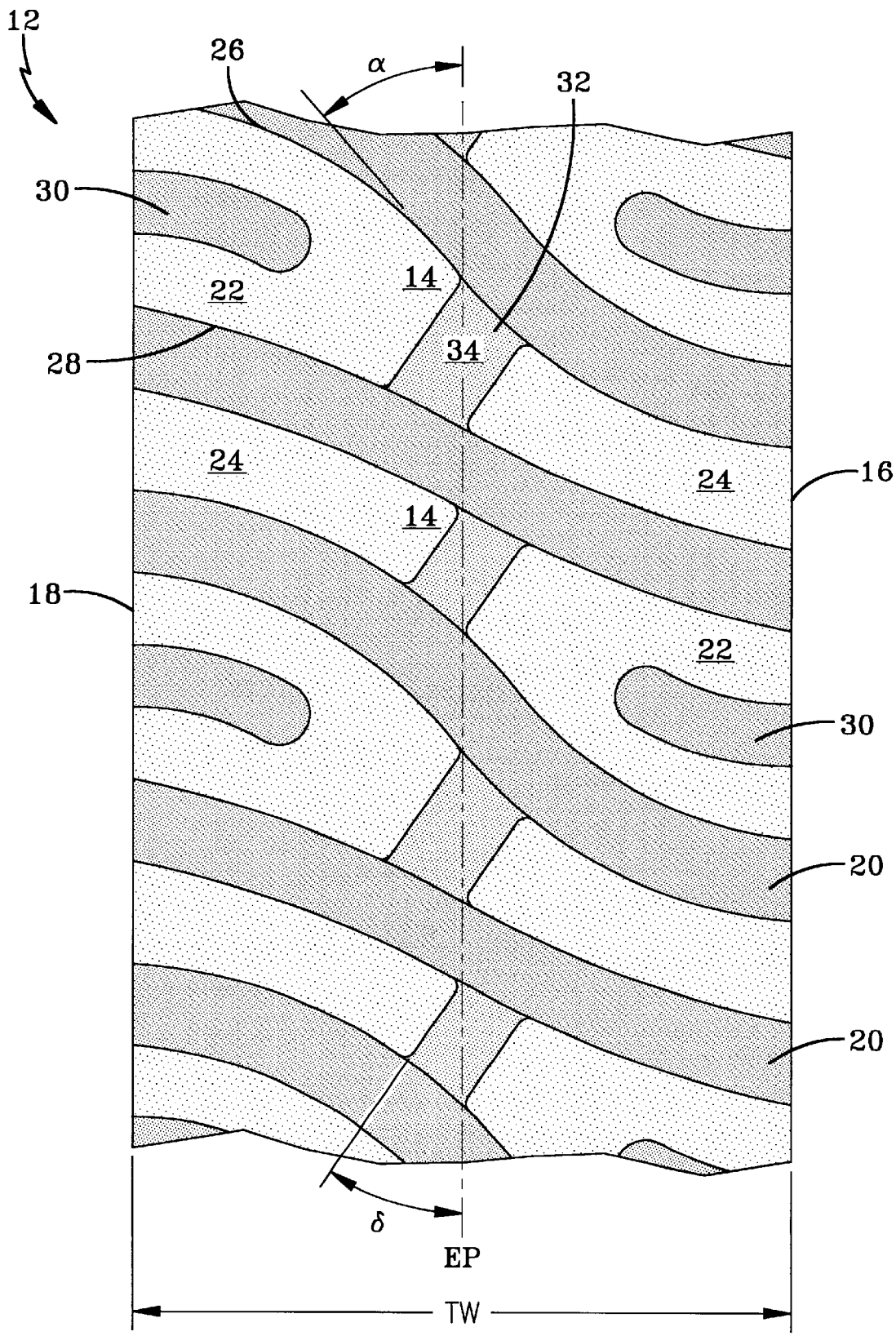
FIG. 4 shows the embodiment of FIG. 2 having shoulder grooves 30 in the wide section 22 of each lug 14 and also having linear grooves 32 crossing each lug 14.

FIG. 4 shows the embodiment of FIG. 3 further having a linear groove 32 crossing each lug 14. The linear grooves 32 cross each lug 14 near the narrow section 24. The linear grooves 32 can be angled across the lugs 14 or may cross in a direction parallel to the centerline. The linear grooves 32 have a width in the range of 5% to 25% of the tread width TW and a depth in the range of 20% to 80% of the nonskid depth NSK. As a result of the decreased depth of the linear grooves 32, a tie bar 34 is located within each linear groove 32. If the linear groove is angled from the centerline of the tread 12, the groove edges will provide additional traction both laterally and circumferentially for the tread 12. The presence of tie bars 34 helps to minimize any decrease in bending stiffness resulting from the linear grooves 32.

Figure 5:
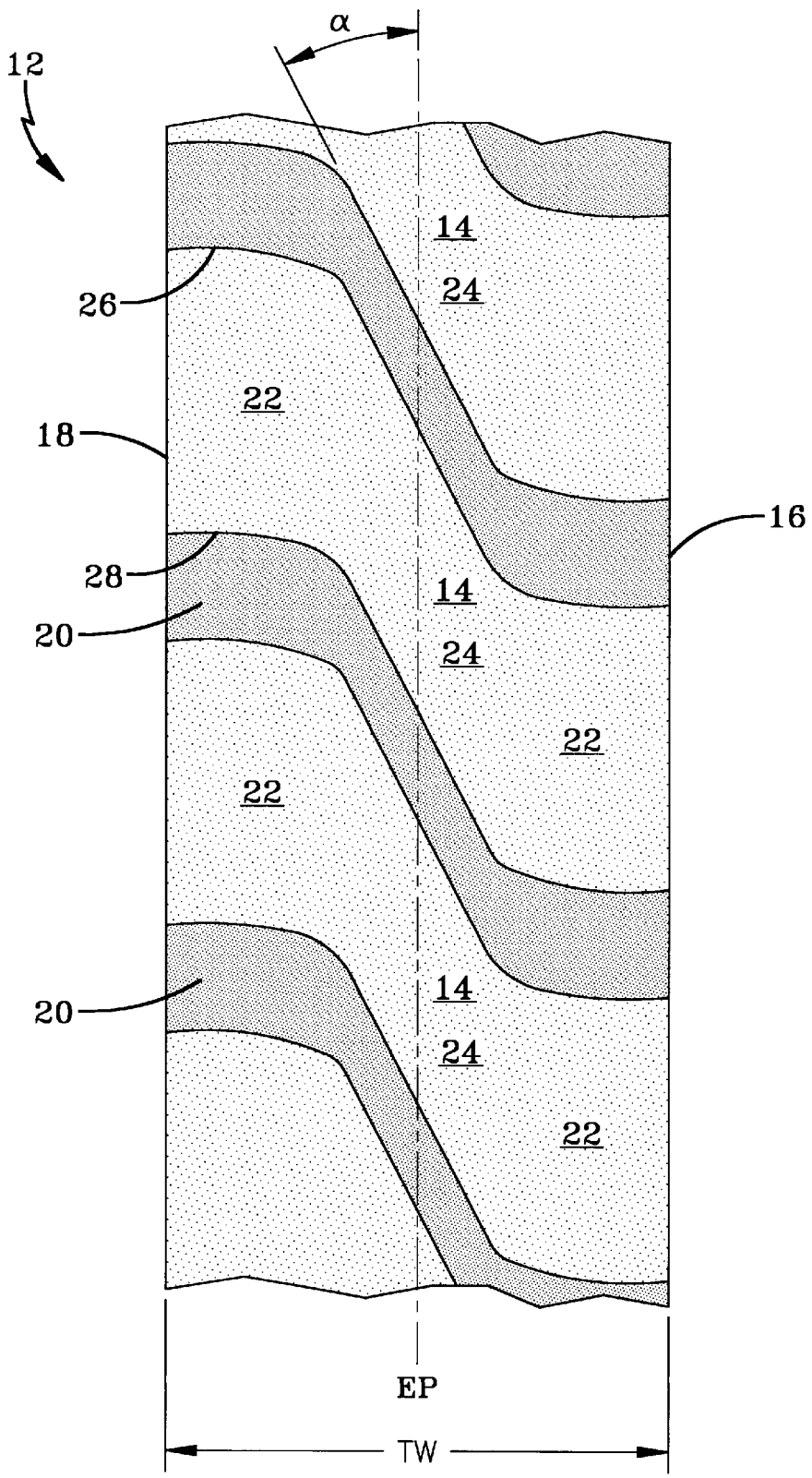
FIG. 5 shows an embodiment of the invention having a wide section 22 near each shoulder and a narrow section 24 near the centerline of the tread 12.

FIG. 5 shows another embodiment of the invention. Each lug 14 in FIG. 5 contains two wide sections 22 and a narrow section 24. Each lug 14 has a first wide section extending from the first shoulder 16. The first wide section is connected to the narrow section 24 as it approaches the centerline of the tread 12. The narrow section 24 is connected to a second wide section as it approaches the second shoulder 18. Although each lug 14 may extend axially from the first shoulder 16 to the second shoulder 18, an incline from the first shoulder 16 to the second shoulder 18 is preferred. The incline of the respective lugs increases the amount of overlap; thus, decreasing the amplitude of the vibration of the tire. Additionally, an incline of the lugs 14 results in inclining the wide grooves 20, increasing the circumferential bending stiffness of the tire 10.

Figure 6:
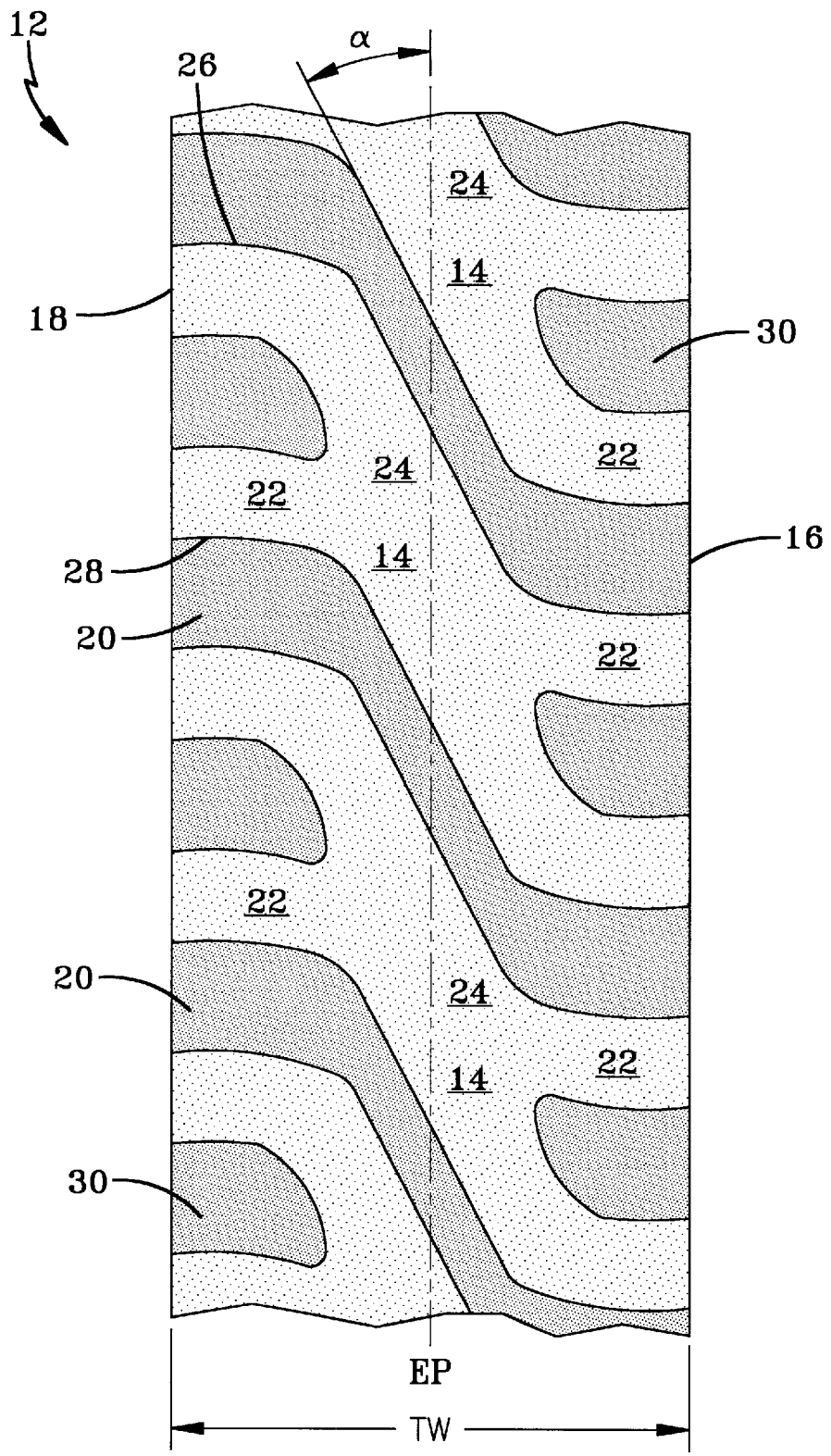
FIG. 6 shows the embodiment of FIG. 5 further having shoulder grooves 30 in each wide section 22 of each lug 14.

In FIG. 6, each wide section 22 of a respective lug 14 has a shoulder groove 30. Each shoulder groove 30 extends from a respective shoulder 16, 18 into the central portion of the wide section 22. The shoulder grooves 30 provide additional edges for traction; thus, increasing the lateral and circumferential traction of the tread 12.

Figure 7:
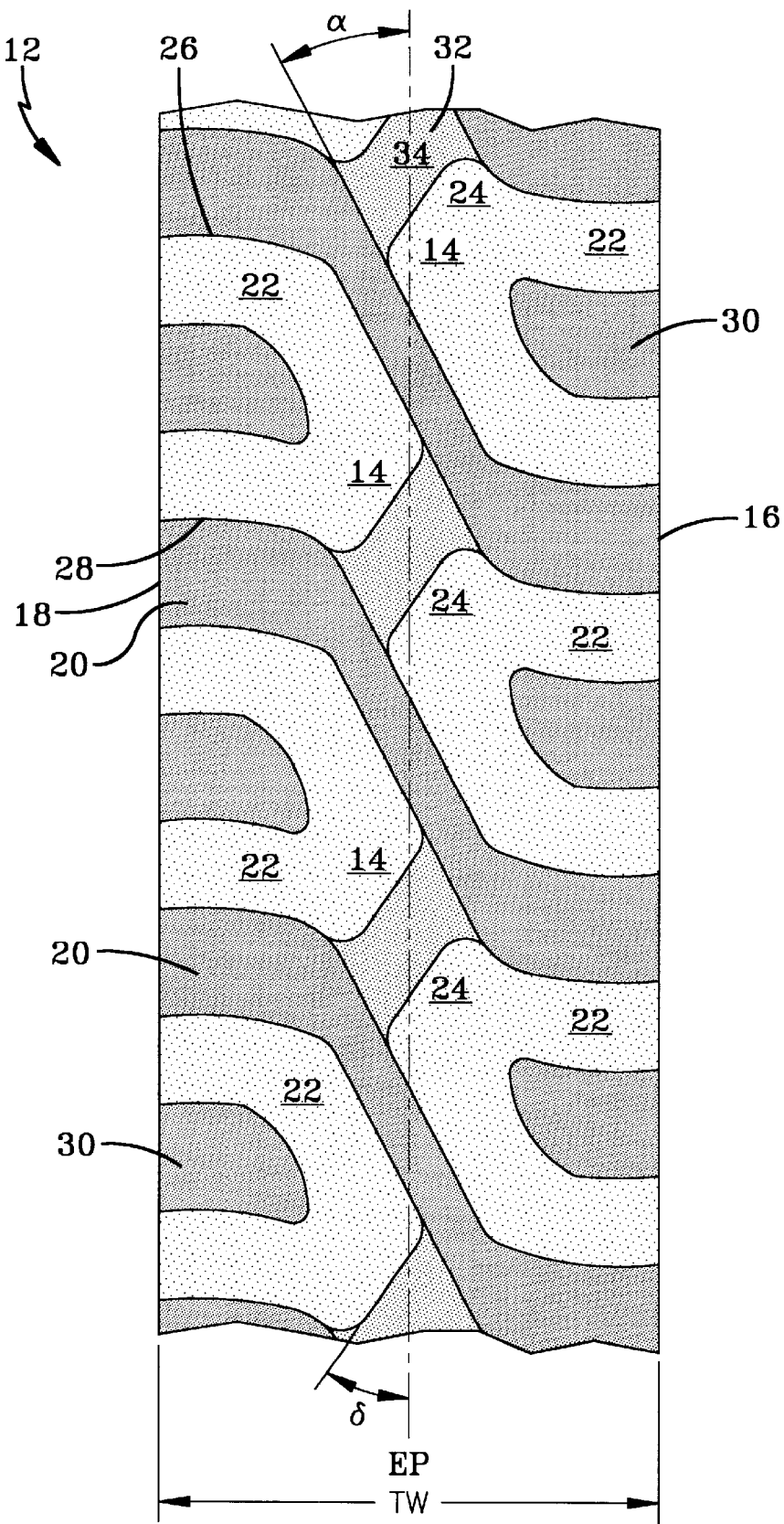
FIG. 7 shows the embodiment of FIG. 5 having shoulder grooves 30 in each wide section 22 and having a linear groove 32 crossing the narrow section 24 of each lug 14.

In FIG. 7, the embodiment of FIG. 6 further has a linear groove 32 crossing each lug 14. The linear groove 32 crosses each lug 14 near the narrow section 24 of the lug 14. The linear groove 32 may be angled from the centerline of the tread 12 or may be parallel to the centerline. Each linear groove 32 has a depth in the range of 20% to 80% of the non-skid depth NSK. The edges of the linear groove 32 provide additional biting edges to provide both circumferential and lateral traction. A tie bar 34 is located under each linear groove 32 to provide both lateral and circumferential stiffness to the lugs 14.

Figure 8:
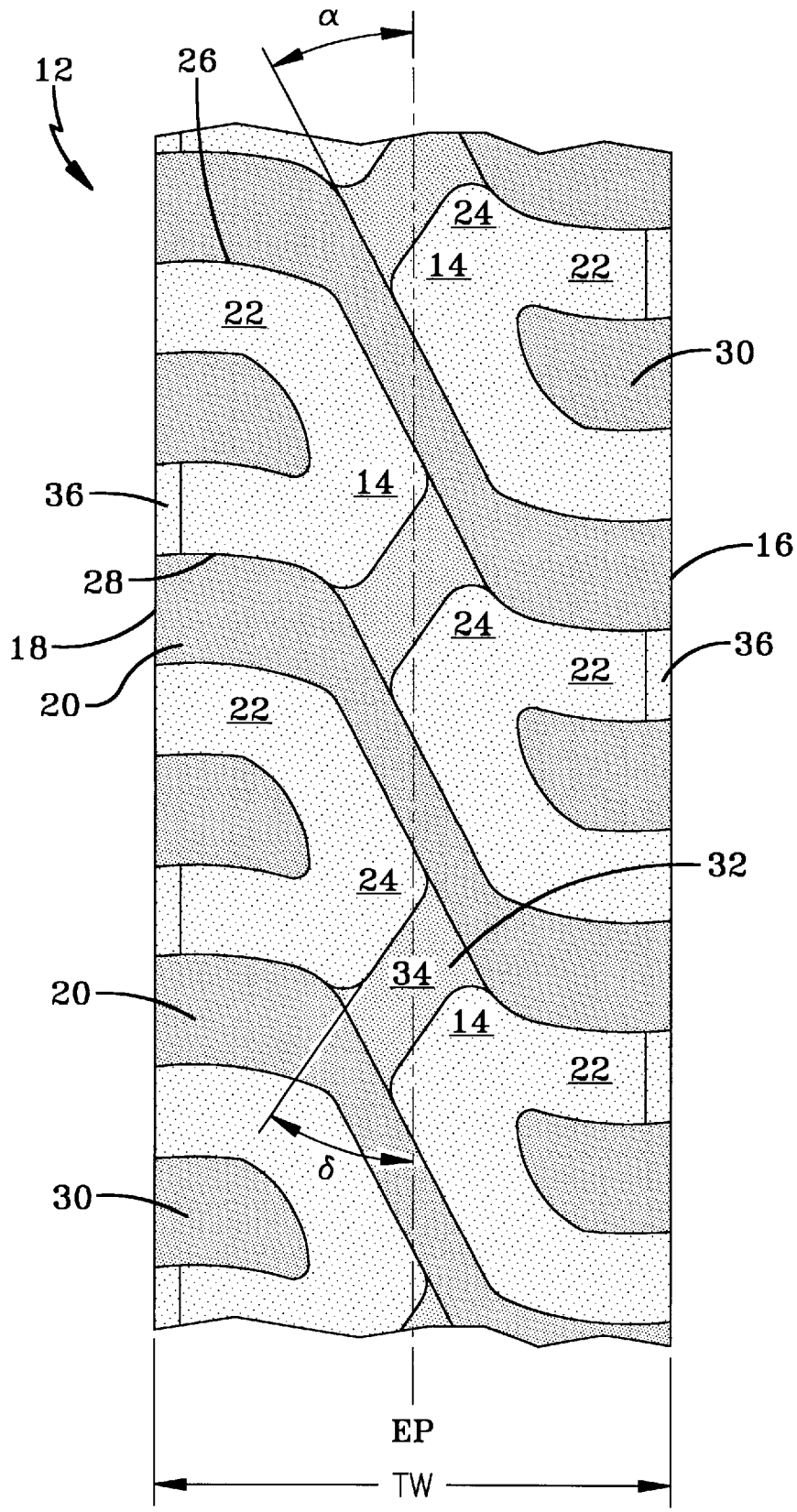
FIG. 8 shows the preferred embodiment of the invention.

FIG. 8 shows the preferred embodiment of the invention. Each lug 14 has two wide sections 22 interconnected by a narrow section 24. Each wide section 22 has a shoulder groove 30 and the narrow section 24 is intersected by a linear groove 32. In the preferred embodiment, each shoulder groove 30 has a depth of full nonskid NSK. The linear grooves 32 are angled from the centerline at an angle δ in the range of 15 to 70 degrees. Each lug 14 further has an offset groove 36 that extends at least partially along a shoulder portion of each wide section 22. Each offset groove 36 has a width in the range of 3% to 15% of the tread width TW. Each offset groove 36 extends from either a leading edge 26 or a trailing edge 28 to the shoulder groove 30 of the respective wide section 22. Each wide groove 20 approaches an angle perpendicular to the centerline as it approaches the respective shoulder 16, 18. However, the wide groove 20 may open slightly as it meets the respective shoulder 16, 18 to enable proper ejection of mud and foreign materials.

The tire 10 of the invention may be molded as one skilled in the art would typically mold a tire. The off-road pneumatic tire 10 of this invention will generally have a nominal rim diameter of at least 20 inches. The tire may also have a varying pitch relationship.

What is claimed is:

1. A pneumatic tire for off-road use on an articulated dump trucks, loaders, graders and other off-road machinery, the pneumatic tire having a tread with a plurality of lugs extending from a first shoulder to a second shoulder, the plurality of lugs being separated by a plurality of wide grooves, the pneumatic tire being characterized by:

each lug of the tread having a wide section near at least one of the respective shoulder and a narrow section crossing a centerline of the tread, a linear groove crossing the narrow section of each lug and the centerline, the linear groove having a depth in the range of 20% to 80% of the wide groove depth so that the lug defines a tie bar, the respective wide section of each lug having a shoulder groove, the shoulder groove extending from a respective shoulder to a central portion of the respective wide section.

2. A pneumatic tire as in claim 1, the tread further being characterized by:

each lug being inclined from the first shoulder to the second shoulder.

3. A pneumatic tire as in claim 1, each lug having a leading edge and a trailing edge, the tread further being characterized by:

both edges of each lug approaching an angle perpendicular to the centerline as each edge approaches a respective shoulder.

4. A pneumatic tire as in claim 1, the tread further being characterized by:

each lug having two wide sections, one wide section near each shoulder.

5. A pneumatic tire as in claim 1, the tread further being characterized by:

each wide groove having a depth, each shoulder groove having a depth equal to the wide groove depth.

6. A pneumatic tire as in claim 1, the tread further being characterized by:

each wide section being axially offset at least partially from a respective shoulder.

\* \* \* \* \*